June 28, 1966 J. M. SHANNON 3,257,750
FISHING LURE
Filed Aug. 24, 1964
FIG. 1
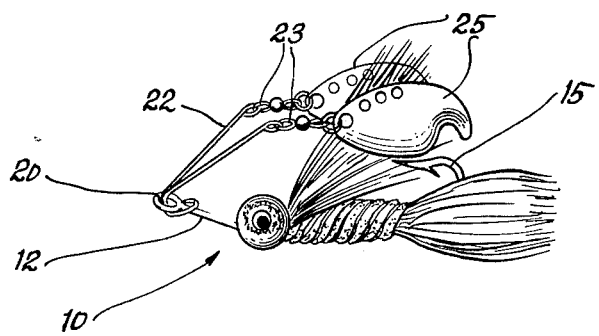
FIG. 3  FIG. 2  FIG. 4
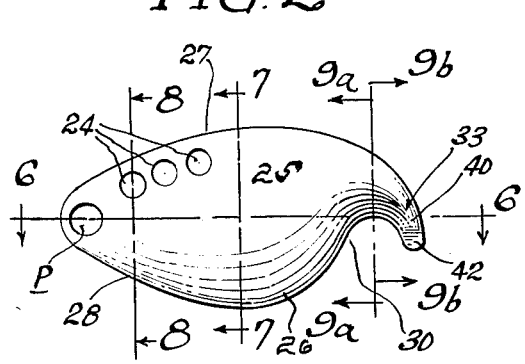 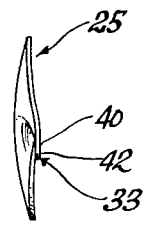
FIG. 5
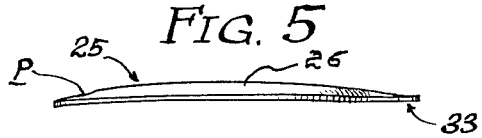
FIG. 7  FIG. 6  FIG. 9a
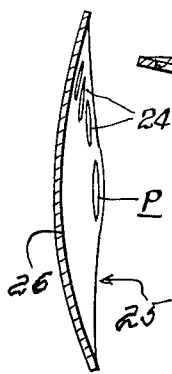 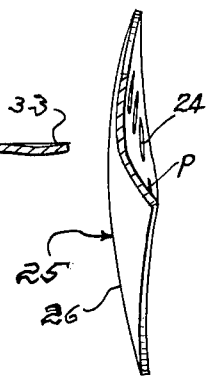
FIG. 8  FIG. 9b
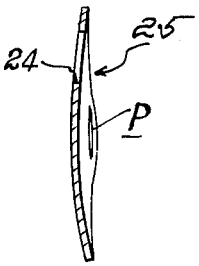 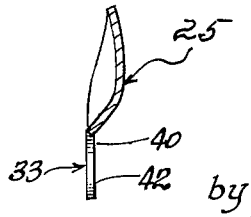
INVENTOR
Jesse M. Shannon
by Frank H. Marks
Nathan N. Kraus
Att'ys

United States Patent Office 3,257,750
Patented June 28, 1966

3,257,750
FISHING LURE
Jesse M. Shannon, 3445 Pratt Blvd., Chicago, Ill.
Filed Aug. 24, 1964, Ser. No. 391,574
5 Claims. (Cl. 43—42.06)

My invention relates to fishing lures, and has to do more particularly with a lure comprising a new and improved spinner.

Spinners of various shapes, generally in the form of a concavo-convex ovoidal blade stamped of sheet metal and given a high polish so as to have a high light-reflective quality when drawn through the water, are old and well known, being employed in their simplest arrangement in conjunction with a hook, the spinner or spinners being loosely mounted for rotation about the shaft of the hook, with or without auxiliary devices for attracting the attention of a fish, such as feathers, bunches of hair, a simulated form of aquatic life being arranged on the shaft of the hook, etc.

As usually offered, such spinners are usually in a simple "tear drop" or ovoid shape which might vary widely as regards the ratio between the major and minor axes. In any event the "action" of the spinner in water is essentially of standard character, usually being confined to a simple spinning or rotation about the shaft on which the spinner blade is mounted.

My invention contemplates a novel spinner blade construction which is so modified from the standard form described above as to impart to the blade, when drawn through the water in the usual retrieving procedure after casting, a peculiar eccentric motion which is quite different from the more-or-less regular action of the standard spinner. By reason of such eccentricity, my improved blade more effectively attracts and retains the attention of a fish and thus is more successful than the standard blade in persuading a fish to strike.

Broadly considered, my invention contemplates a spinner blade which is distorted from the standard teardrop shape in several respects. Thus, it might be considered, in a sense, that I have added to the trailing end of a more-or-less standard "tear-drop" shaped blade a hook-like appendage, one outer edge of which is a continuation of one edge of the tear-drop while the opposite edge follows a generally S-shaped curve. Considering the faces of the blade, it maybe said that the faces of the tear-drop portion of the blade are wiped into the adjacent faces of the hook-shaped appendage, while the tail portion of the hook is given a slight reversal, as regards the major axis of the blade, in order to impart an eccentric screw action.

Additionally, a plurality of perforations are provided adjacent one edge and disposed nearer the leading end of the blade, as the blade is retrieved, water rushes through these perforations, creating additional turbulence or sonic vibrations which are believed to be highly effective in attracting the attention of fish in the vicinity. By reason of its high sensitivity to sound vibrations in the water, a fish instinctively turns toward the source of such vibrations and is then visually attracted by the reflected light and erratic motion of the lure.

My invention will be more fully understood by reference to the appended drawings forming a part of this specification and illustrating a preferred embodiment of my invention, wherein FIG. 1 is a perspective view of a particular type of lure to which my invention may be applied;

FIG. 2 is a plan view on an enlarged scale showing one side of a novel spinner blade embodying my invention and constituting elements of the lure shown in FIG. 1;

FIG. 3 is an elevational view of the leading end of the blade shown in FIG. 2;

FIG. 4 is an elevation of the trailing end of the same blade;

FIG. 5 is a longitudinal plan taken of the lower edge of the blade;

FIG. 6 is a longitudinal sectional view, on an enlarged scale, taken substantially along the line 6—6 of FIG. 2;

FIG. 7 is a transverse section taken substantially along the line 7—7 of FIG. 2 on a further enlarged scale;

FIG. 8 is a transverse section taken substantially along the line 8—8 of FIG. 2;

FIG. 9a is a transverse section taken substantially along the line 9—9 of FIG. 2 and looking toward the leading end of the lure, and FIG. 9b is a sectional view taken substantially along the line 9—9 of FIG. 2 and looking toward the trailing end.

As stated above, my invention has to do with an improved spinner which may be incorporated in a wide variety of lures.

FIG. 1 shows in perspective a lure 10 which is generally speaking, of the well-known type known in fishing circles as a "Shannon Spinner." This popular and successful lure comprises a main shaft 12 terminating in a barbed hook 15 and carrying on the shaft a simulated body of an insect, minnow or other form of life designed to interest a fish. An eye 20 is formed on the leading end of the shaft 12 and looped through said eye is a bifurcated resilient wire carrier 22, the legs of which diverge and also terminate in eye portions to which are secured, through the intermediary of a plurality of links 23, spinner blades 25, 25 incorporating my invention.

It might be said parenthetically that the standard "Shannon" type of lure is essentially similar to that shown in FIG. 1 except that, in lieu of the improved blades illustrated herein a more-or-less standard type of tear drop or ovoid blade without perforations is employed.

Turning now to the detail views, it will be seen that my improved blade 25, which is preferably stamped out of a suitable sheet metal and provided with a high polish, is in the main concavo-convex along its major and minor axes as defined by the section lines 6—6 and 7—7 and has the usual perforation P adjacent its leading end for engagement with a ring or other suitable attachment for securing it to a lure such as that shown in FIG. 1 or to another type of lure.

Referring to the major longitudinal edges of the blade, as seen clearly in FIG. 2, it will be noted that, instead of being essentially symmetrical as in the usual ovoidal blade, one edge 27 is essentially a continuous curve from front to rear, being generally ovoid in character, while the opposite edge 28 is a discontinuous curve, first following a generally ovoidal character of shorter major axis than curve 27 and then having a point of inflection at or about the point 30.

Thus, it will be seen that the edge 28 follows a generally S-shaped curve meeting the edge 27 rearwardly in a relatively blunt hook or tail portion 33. The blade comprises a major generally ovoidal body portion 26 and a wedge-shaped tail portion 33.

Looked at somewhat differently, it may be said that my improved blade comprises a generally ovoid portion which merges asymmetrically into a wedge-shaped appendage or tail. More fancifully, as seen in FIG. 2, the blade resembles a mouse with a pendulous abdomen and rather thick tail.

A plurality of spaced perforations 24 are disposed adjacent edge 27, beginning a slight distance rearwardly of perforation P, for a purpose described herebelow.

Considered in cross-section, my improved blade is generally concavo-convex of substantially regular curvature, and this is particularly applicable to the main ovoidal portion 26, as seen clearly in the sectional views of FIGS.

6 and 7. The tail portion or appendage 33 is likewise essentially concavo-convex, as seen in FIGS. 9a and 9b. However, as will be seen in FIG. 4, the tail portion 33 tends to become flattened in its terminal portion 42, extending beyond the major axis indicated by section line 6—6, and it will be noted that, at or about where said line passes through the appendage 33, the curvature of tail 33 encounters a point of inflection as indicated by numeral 40 in FIG. 4. The purpose of this inflection is to impart to the tail a screw-like effect which is evidenced in the action of the blade in the water as an eccentric wiggle-like motion deviating markedly from the regularity of the standard ovoidal spinner. The degree of the eccentricity may be varied by the amount of reverse twist given to the terminal portion 42 of the tail, which is shown as very slight in FIG. 4, but may be increased within limits to any desired extent.

It will be seen that my invention provides a novel construction of spinner blade having a plurality of novel features which cooperate to produce a new and unusual result. I have found in my experimentation that the provision of perforations such as those indicated by numeral 24 permits water to rush through them as the lure is retrieved, producing sonic vibrations in the water which attract fish in the vicinity. However, if such perforations are provided in a blade of the usual ovoidal shape, they tend to throw the blade off balance, resulting in undesirable action in the water.

I find that the provision of a tail or appendage of the character herein shown and described tends to balance the otherwise upsetting effect of the perforations. Thus, the holes and tail tend to balance and compensate for each other, producing not only sonic effects from the aquatic reaction against the holes and the tail (the semicircular edge below the tail serving as a semi-aperture) but also produce a combined effect with regard to the erratic, semi-helical wiggling movement through the water.

Spinners of my improved construction and design, contrary to the standard ovoidal spinner, may be made in right- and left-hand designs. That is to say, a spinner having the contours seen in the drawings, may be reversed in stamping as regards the concavo-convex surfaces, resulting in a reversal of the action.

If a pair of such spinners of right- and left-hand design are used in a twin-spinner lure such as that shown in FIG. 1, it will be apparent that it will have a radically different movement in the water from that of a lure comprising a pair of identically similar spinners. As will be apparent to any experienced fisherman, such a composite lure may be provided with means for detaching and changing the spinners at will (as by means of the usual "hairpin" type of attachment). Thus, the fisherman may, by a simple operation, by changing his spinners from a pair of similar ones to a pair of right- and left-hand design, produce an entirely different action.

Furthermore, as indicated above, my improved spinners may be employed in a variety of types of lures, including not only the well-known "Shannon" type shown in FIG. 1 but various others, including those comprising one or more spinners arranged in tandem relation on a common shaft. In the latter type, again, the spinners may be either similar or of right- and left-hand design.

When a pair of novel spinners embodying my invention are mounted on opposite sides of a lure such as that illustrated in FIG. 1, it is found that, for some reason which I cannot explain, in the retrieving action, the spinners periodically collapse or discontinue their rotary movement, causing the lure to roll and dart in various directions, thus adding to the simulated effect of a disabled minnow and contributing increased attraction to a game fish in the vicinity.

The combination of the sonic effect produced by my novel design, which first attracts the attention of a fish in the vicinity, and the high light reflection from the surfaces of the spinner, give the fish both vibratory and visual means for locating the lure. One he has "zeroed in" on the lure, the erractic action thereof, simulating natural aquatic life, stimulates in a game fish the desire to strike.

Various changes coming within the spirit of my invention will doubtless suggest themselves to those skilled in the art; hence, I do not wish to be limited to the specific forms herein shown and described, but intend that my invention is to be limited only by the scope of the appended claims.

I claim:
1. In a fishing lure,
  (a) a spinner adapted for rotation about a pivot disposed adjacent the forward end thereof,
  (b) said spinner, comprising a generally concavo-convex blade having a forward major area of generally ovoid contour,
  (c) and a trailing hook-form appendage, said major area and said appendage defining a pair of longitudinal edges,
  (d) one of said edges forming a substantially continuous major ovoidal arc,
  (e) the other edge forming forwardly an ovoidal arc of minor length, said minor ovoidal arc terminating in a point of inflection followed by a generally semicircular arc, whereby said other edge defines a generally S-shaped curve having a long forward arc and a short reverse after arc.
2. A lure as in claim 1, wherein
  (a) said minor ovoidal arc terminates generally adjacent a major axis drawn through said pivot,
  (b) said appendage extending beyond said axis toward a rearward projection of said minor arc.
3. A lure as in claim 2, wherein the major part of the opposite faces thereof are essentially of a three-dimensional curvature defining continuous concavo-convex surfaces, the free end of said appendage being distorted reversely from said curvature.
4. A lure as in claim 2 having a plurality of spaced perforations disposed forwardly adjacent the edge of said major arc.
5. A lure as in claim 1,
  (a) having at least one perforation disposed adjacent the forward portion of said major area and adjacent said one edge,
  (b) said appendage and after arc defining a recess,
  (c) said perforation and said appendage and recess being so balanced as substantially to compensate for each other in the action of the lure when retrieved.

References Cited by the Examiner

UNITED STATES PATENTS

| D. 180,484 | 6/1957 | Hanks. | |
| 1,290,571 | 1/1919 | Kawasaki | 43—42.52 |
| 1,890,400 | 12/1932 | Miller | 43—42.52 X |

FOREIGN PATENTS

| 672,568 | 10/1963 | Canada. |
| 928,759 | 6/1947 | France. |

ANTONIO F. GUIDA, *Acting Primary Examiner.*
SAMUEL KOREN, *Examiner.*
R. L. HOLLISTER, *Assistant Examiner.*